United States Patent [19]

Jones et al.

[11] Patent Number: 5,071,796

[45] Date of Patent: Dec. 10, 1991

[54] FLAT GLASS COMPOSITION WITH IMPROVED MELTING AND TEMPERING PROPERTIES

[75] Inventors: James V. Jones, Cumberland, Md.; Stanley M. Ohlberg, New Paris, Pa.

[73] Assignee: PPG Industries, Inc., Pittsburgh, Pa.

[21] Appl. No.: 393,335

[22] Filed: Aug. 14, 1989

[51] Int. Cl.$^5$ .............................................. C03C 3/087
[52] U.S. Cl. ........................................ 501/70; 501/69
[58] Field of Search ...................... 501/96, 12, 11, 27, 501/31, 70, 71; 106/52

[56] References Cited

FOREIGN PATENT DOCUMENTS 1384549 3/1988 U.S.S.R. .

*Primary Examiner*—William R. Dixon, Jr.
*Assistant Examiner*—Paul Marcantoni

*Attorney, Agent, or Firm*—Donald C. Lepiane; Dennis G. Millman

[57] ABSTRACT

A glass composition particularly suitable for flat glass manufacture having lower melting temperature, wide working range, improved surface durability, and enhanced tempering performance has the following composition:

| | |
|---|---|
| $SiO_2$ | 66.0–69.1 weight percent |
| $Al_2O_3$ | 2.0–4.0 |
| ($SiO_2 + Al_2O_3$) | Less than 71.6 |
| $Na_2O$ | 15–19 |
| $K_2O$ | 0–2 |
| ($Na_2O + K_2O$) | 15–20 |
| CaO | 7.5–9 |
| MgO | 2–4 |
| (CaO + MgO) | 10.2–12.0 |
| (CaO/MgO) | 1.9–3.5 |

14 Claims, No Drawings

FLAT GLASS COMPOSITION WITH IMPROVED MELTING AND TEMPERING PROPERTIES

BACKGROUND OF THE INVENTION

The present invention relates to an improved soda-lime-silica flat glass composition that yields economic advantages in melting and forming, better tempering characteristics, and improved surface durability. The composition is particularly suited to the manufacture of flat glass by the float process.

The composition of commercially produced flat glass has become rather narrowly standardized, with the compositions of flat glass products made by various manufacturers around the world seldom varying more than one or two percentage points of the major constituents from the following typical compositions:

| Constituent | Weight Percent |
| --- | --- |
| $SiO_2$ | 73.08 |
| $Na_2O$ | 13.68 |
| $K_2O$ | 0.02 |
| CaO | 8.94 |
| MgO | 3.88 |
| $Al_2O_3$ | 0.11 |
| $SO_3$ | 0.23 |
| $Fe_2O_3$ | 0.12 |

Compositions of this type have become standard because they yield a carefully balanced set of properties that are desired for manufacture and subsequent processing of flat glass products. Varying one constituent for the sake of improving one property usually has adverse effects on at least one or more other properties. Some of the properties for which the standard flat glass composition had heretofore been considered optimized include: minimized melting temperature, avoidance of devitrification during forming, surface abrasion resistance, surface weather durability, low refractory attack during melting, temperability, and batch cost. The melting temperature of the standard flat glass composition set forth above is 2630° F. It has long been known that reducing the amount of silica and/or increasing the amount of alkali in the glass can lower the melting temperature of the glass and lower the energy requirements for melting, but doing so undesirably reduces the surface durability of the glass product. Adjusting other constituents to compensate for the loss of durability can result in other drawbacks such as a reduction in the "working range," that is, a reduction in the temperature range in which the glass can be formed without substantial devitrification of the glass. As a result, it has heretofore been considered impractical for flat glass producers, particularly float glass producers, to lower the silica content of the glass significantly below 70 percent in order to obtain the melting advantages and energy savings.

U.S. Pat. No. 3,833,388 (Ohlberg et al.) discloses a flat glass composition having a higher alkali content than usual, but with the silica content no lower than 70 percent. Therefore, the full potential of reducing the melting temperature is not realized by that composition.

U.S. Pat. No. 3,779,733 (Janakirama-Rao) discloses broad compositional ranges for flat glass compositions that include silica concentrations considerably below 70 percent, but does not provide enablement for successfully producing flat glass having a silica concentration lower than 70 percent. The patent deals with producing a glass product having certain transmittance characteristics, not with improving melting properties.

U.S. Pat. No. 2,581,639 (Duncan et al.) discloses a television faceplate glass adapted to be sealed to a metal component and described as being suitable for manufacture by the sheet drawing process. The silica concentration is only slightly below 70 percent.

U.S. Pat. No. 2,669,808 (Duncan et. al.) discloses another glass composition adapted for sealing to metal components of a television tube. The glass is intended to be made by a sheet drawing process, but the silica concentration is extremely low for the glass to be considered suitable for general flat glass applications such as building or vehicle glazing. The low silica concentration would be expected to result in low surface durability.

Japanese Patent No. 61-197444 discloses soda-lime-silica glass compositions with silica concentration below 70 percent for the purpose of improving the tempering properties of the glass. The lower SiO2 concentrations together with higher than usual CaO concentrations would be expected to yield melting advantages. However, the reliance on increasing the CaO concentration and maintaining relatively moderate amounts of alkali result in undesirable flattening of the temperature/viscosity curve, so that temperatures at the viscosity range suitable for forming into a flat ribbon are increased and the danger of devitrification is increased (i.e. the working range is decreased). For some float forming operations, some of the examples disclosed in the Japanese patent could not be formed without devitrification or would require considerable cooling of the glass between the melting and forming stages. Although the patent discloses a fairly broad range of alumina, attainment of the desired results appears to require a relatively large amount of alumina (5%) in the examples or a combination of alumina and titania, both of which add substantially to the batch cost. A relatively high total of silica and alumina in the examples also indicates that reduction of the melting temperature was not optimized.

A general discussion of soda-lime-silica glasses, their constituents, and the relationship between the constituents and some of the properties of the glass products can be found in The Properties of Glass by G. W. Morey (Reinhold, 1954) pages 74-78. Of the several examples of glass compositions given there, none of the examples having less than 70 percent silica are mass-produced flat glass. Example 1 at 60 percent silica is described as lacking in durability.

SUMMARY OF THE INVENTION

The present invention is a specifically defined range of soda-lime-silica glass compositions that has been discovered to possess a unique combination of advantageous properties for flat glass manufacture: lower melting temperatures (lower than 2590° F., and in the best examples lower than 2560° F.); a suitably wide working range for flat forming into flat glass of at least 50° F.; improved surface durability; and improved tempering capabilities. This combination of properties has been found to be yielded by a composition characterized in general by silica concentrations reduced below 70%, relatively high alkali content, substantially more alumina than is common in flat glass, and carefully defined amounts of CaO and MgO. More specifically, the composition of the present invention is defined as follows:

| Constituent | Range (Weight Percent) | Preferred Range (Weight Percent) |
| --- | --- | --- |
| $SiO_2$ | 66.0–69.1 | 66.5–68.5 |
| $Al_2O_3$ | 2.0–4.0 | 2.0–4.0 |
| ($SiO_2$ + $Al_2O_3$) | Less than 71.6 | Less than 71.1 |
| $Na_2O$ | 15–19 | 16.5–19 |
| $K_2O$ | 0–2 | 0–2 |
| ($Na_2O$ + $K_2O$) | 15–20 | 17.2–20 |
| CaO | 7.5–9 | 7.5–8.5 |
| MgO | 2–4 | 2–4 |
| (CaO + MgO) | 10.2–12.0 | 10.2–12.0 |
| (CaO/MgO) | 1.9–3.5 | 1.9–3.5 |

Colorants such as iron oxide, selenium, cobalt oxide may also be present in the glass in minor amounts seldom exceeding one percent of the total composition in accordance with conventional practice for making colored glass. Traces of melting and refining aids conventionally employed in the art such as $SO_3$ may also be present in minor amounts without affecting the properties of the glass.

DETAILED DESCRIPTION OF THE INVENTION

In a soda-lime-silica glass, silica is the major constituent because it primarily forms the glass network. Silica is also the most difficult constituent to melt. Reducing the silica content of the glass of the present invention below 70% results in lower melting temperatures. Alumina also tends to increase the melting temperature, but in the present invention it has been discovered that by substituting alumina for some of the silica permits the total content of silica plus alumina to be lowered, thereby lowering the melting temperature. At the same time, alumina improves the durability of the glass against surface corrosion, so the loss of durability caused by reducing the amount of silica in the glass has been found to be more than offset by substituting a lesser amount of alumina. Surprisingly, the surface durability has been found to be even greater than standard commercial flat glass. Accordingly, with a silica content of 66.0 to 69.1 percent by weight, preferably from 66.5 to 68.5 percent, and a total silica plus alumina content less than 71.6 percent by weight, melting temperatures less than 2590° F., and in the best cases less than 2560° F., are attained by the present invention without loss of durability. Melting temperature is defined as the temperature of the glass at which its viscosity is 100 poises. The alumina content is limited to the range of 2.0 to 4.0 percent by weight because alumina concentrations outside this range have been found to raise the liquidus temperature of this type of glass composition. The liquidus temperature is that at which the glass begins to devitrify, which causes undesirable haziness in the glass product. It is essential that the glass be cooled relatively quickly through the devitrification temperatures after it has been formed into a flat ribbon or other product shape so that devitrification is not occurring during forming. Therefore, it is desirable for the liquidus temperature to be substantially lower than the forming temperature. For the purposes of the present invention the forming temperature is defined as the temperature at which the viscosity of the glass is 10000 poises. The difference between the forming temperature and the liquidus temperature is known as the working range. It is desirable for the working range to be greater than 40 degrees F., preferably greater than 50 degrees F.

This is achieved in part by the carefully delimited alumina concentration range of the present invention.

The chief alkali in soda-lime-silica glass is sodium oxide, with minor amounts of potassium oxide entering as an impurity from some of the raw materials, particularly the source material for the alumina. The alkalis act as fluxes, that is, they help dissolve the grains of silica, thereby permitting melting to take place substantially below the melting temperature of silica alone. The alkali content of the glass composition of the present invention is relatively high for the sake of lowering the melting temperature, but amounts in excess of the 20 percent maximum can result in reduction of surface durability and an increase in the corrosive effect of the molten glass on furnace refractories.

Calcium oxide and magnesium oxide also act as fluxes to aid the dissolution of the silica. Their presence is also desirable for the sake of improving durability, but calcium oxide can have a negative effect on the working range. By carefully controlling the amounts of calcium and magnesium oxides individually and in total, as well as the amount of calcium oxide relative to the amount of magnesium oxide, it has been found that the glass of the present invention can attain the combined advantages of reduced melting temperature, enhanced durability, and an adequate working range. More specifically, it has been found that the calcium oxide concentration should be 7.5 to 9 percent by weight, preferably 7.5 to 8.5 percent by weight. The best examples have less than 8.1 percent by weight for optimum working range. It has been found that the total calcium and magnesium oxide content should be from 10.2 to 12.0 weight percent of the total glass composition, and that the weight ratio of the calcium oxide concentration to the magnesium oxide concentration should be from 1.9 to 3.5. The presence of magnesium oxide is useful in that it serves many of the same functions of calcium oxide but without as much of a harmful effect on the working range.

The examples set forth herein demonstrate the principles of the invention discussed above. Examples 1 through 15 (Table I) show soda-lime-silica glass compositions that are close to but outside the compositional ranges of the present invention, and the failure of those examples to attain the advantages of the present invention is shown in the physical properties set forth. Examples 16 to 28 (Table II), on the other hand, are embodiments of the present invention and, to a varying degree, exhibit the advantageous combination of improved physical properties that have been discussed. In the examples the melting temperature and forming temperature were determined by the rotating cylinder method. This method is described in the Journal of Research of the National Bureau of Standards, Vol. 68A, No. 5, September-October 1964. The forming temperature is defined as the temperature at which the logarithm of the viscosity of the glass in poises is 4.0. The working range is the forming temperature minus the liquidus temperature, the latter having been determined by means of ASTM procedure C-829 which employs a platinum boat of the glass in a gradient furnace.

Examples 1, 3, 7, 8, and 12 exhibit higher melting temperatures than desired, attributable at least in part to high $SiO_2$ concentrations or high totals of $SiO_2$ plus $Al_2O_3$. Example 7 is also low in its $Na_2O$ concentration, but comparing Examples 7 and 8 demonstrates that merely raising the amount of $Na_2O$ and lowering the amount of $SiO_2$ does not yield the degree of improvement desired. Example 9, with a low $Al_2O_3$ content and a slightly high $SiO_2$ concentration, might be considered marginally acceptable, but the minor improvement in melting temperature does not justify changing composition. Many of the other examples in Table I show the unacceptable reduction in the working range (in some cases even producing a negative working range) that can be caused by attempting to lower the melting temperature by partially replacing $SiO_2$ with $Na_2O$ and CaO. The poor working range in Examples 5, 6, and 14 can be attributed to an excess of CaO. In Examples 10 and 11 too much MgO appears to be the cause of undesirably small working ranges. Example 11 also has a low concentration of $Al_2O_3$. High totals for CaO plus MgO lead to unacceptable working ranges in Examples 4, 6, 10, 11, 13, and 15. The poor working ranges in Examples 5 and 14 illustrate the importance of the ratio of the amount of CaO to the amount of MgO. This ratio appears to be a factor in the unacceptable working ranges of Examples 6, 10, and 11 as well. In Table II all of the examples have acceptable working ranges and melting temperatures, although the melting temperatures of Examples 17, 18, and 20 are slightly higher than the others and are therefore not among the preferred examples.

TABLE I

| | 1 | 2 | 3 | 4 | 5 |
|---|---|---|---|---|---|
| $SiO_2$ | 69.52 | 68.59 | 67.66 | 67.43 | 67.29 |
| $Al_2O_3$ | 3.17 | 3.13 | 4.83 | 2.67 | 2.66 |
| ($SiO_2 + Al_2O_3$) | 72.69 | 71.72 | 72.49 | 70.10 | 69.95 |
| $Na_2O$ | 15.98 | 15.44 | 15.14 | 16.62 | 17.50 |
| $K_2O$ | 0.67 | 0.67 | 1.01 | 0.58 | 0.58 |
| ($Na_2O + K_2O$) | 16.65 | 16.11 | 16.15 | 17.20 | 18.08 |
| CaO | 7.62 | 8.70 | 8.23 | 8.96 | 9.10 |
| MgO | 2.63 | 3.01 | 2.82 | 3.39 | 2.48 |
| (CaO + MgO) | 9.25 | 11.71 | 11.05 | 12.35 | 11.58 |
| (CaO/MgO) | 2.897 | 2.916 | 2.918 | 2.64 | 3.669 |
| $SO_3$ | 0.30 | 0.27 | 0.31 | 0.29 | 0.30 |
| $Fe_2O_3$ | 0.102 | 0.052 | 0.067 | 0.072 | 0.73 |
| Melting Temp. °F. | 2603 | 2558 | 2637 | 2532 | 2497 |
| Forming Temp. °F. | 1848 | 1835 | 1881 | 1817 | 1791 |
| Working Range °F. | 146 | 5 | 63 | 16 | 13 |

| | 6 | 7 | 8 | 9 | 10 |
|---|---|---|---|---|---|
| $SiO_2$ | 67.23 | 73.09 | 71.37 | 70.60 | 67.66 |
| $Al_2O_3$ | 2.69 | 1.35 | 1.31 | 1.30 | 2.24 |
| ($SiO_2 + Al_2O_3$) | 69.92 | 74.44 | 72.68 | 71.90 | 69.90 |
| $Na_2O$ | 16.49 | 13.30 | 15.62 | 15.63 | 15.69 |
| $K_2O$ | 0.59 | 0.29 | 0.29 | 0.30 | 0.49 |
| ($Na_2O + K_2O$) | 17.08 | 13.59 | 15.91 | 15.93 | 16.18 |
| CaO | 10.08 | 7.99 | 8.09 | 8.03 | 8.56 |
| MgO | 2.54 | 3.54 | 2.88 | 3.72 | 4.96 |
| (CaO + MgO) | 12.62 | 11.53 | 10.97 | 11.75 | 13.52 |
| (CaO/MgO) | 3.968 | 2.257 | 2.809 | 2.159 | 1.726 |
| $SO_3$ | 0.32 | 0.35 | 0.29 | 0.30 | 0.33 |
| $Fe_2O_3$ | 0.073 | 0.87 | 0.88 | 0.089 | 0.075 |
| Melting Temp. °F. | 2496 | 2697 | 2616 | 2591 | 2500 |
| Forming Temp. °F. | 1801 | 1924 | 1860 | 1849 | 1801 |
| Working Range °F. | −66 | 124 | 137 | 98 | 7 |

| | 11 | 12 | 13 | 14 | 15 |
|---|---|---|---|---|---|
| $SiO_2$ | 67.72 | 69.34 | 67.66 | 67.46 | 66.76 |
| $Al_2O_3$ | 1.64 | 3.22 | 2.06 | 3.24 | 3.13 |
| ($SiO_2 + Al_2O_3$) | 69.36 | 72.56 | 69.72 | 70.70 | 69.89 |
| $Na_2O$ | 16.32 | 15.47 | 17.01 | 16.21 | 17.00 |
| $K_2O$ | 0.38 | 0.69 | 0.48 | 0.70 | 0.68 |
| ($Na_2O + K_2O$) | 16.78 | 16.16 | 17.49 | 16.91 | 17.68 |
| CaO | 8.61 | 7.69 | 8.98 | 9.30 | 8.76 |
| MgO | 4.92 | 3.33 | 3.40 | 2.70 | 3.26 |
| (CaO + MgO) | 13.53 | 11.02 | 12.38 | 12.00 | 12.02 |
| (CaO/MgO) | 1.750 | 2.279 | 2.641 | 3.444 | 2.687 |
| $SO_3$ | 0.33 | 0.31 | 0.34 | 0.31 | 0.27 |
| $Fe_2O_3$ | 0.083 | 0.64 | 0.067 | 0.088 | 0.102 |
| Melting Temp. °F. | 2529 | 2632 | 2499 | 2548 | 2518 |
| Forming Temp. °F. | 1823 | 1869 | 1789 | 1818 | 1799 |
| Working Range °F. | −37 | 107 | 47 | 0 | −16 |

TABLE II

| | 16 | 17 | 18 | 19 | 20 |
|---|---|---|---|---|---|
| $SiO_2$ | 67.26 | 67.89 | 69.09 | 67.93 | 68.72 |
| $Al_2O_3$ | 3.80 | 3.17 | 2.06 | 2.70 | 2.68 |
| ($SiO_2 + Al_2O_3$) | 71.06 | 71.06 | 71.15 | 70.63 | 71.40 |
| $Na_2O$ | 17.33 | 16.46 | 16.63 | 17.00 | 15.90 |
| $K_2O$ | 0.82 | 0.69 | 0.47 | 0.58 | 0.58 |
| ($Na_2O + K_2O$) | 18.15 | 17.15 | 17.10 | 17.58 | 16.48 |
| CaO | 8.09 | 7.85 | 7.51 | 8.70 | 7.95 |
| MgO | 2.38 | 3.56 | 3.82 | 2.69 | 3.81 |
| (CaO + MgO) | 10.47 | 11.41 | 11.33 | 11.39 | 11.76 |
| (CaO/MgO) | 3.399 | 2.205 | 1.966 | 3.234 | 2.087 |
| $SO_3$ | 0.29 | 0.31 | 0.34 | 0.33 | 0.29 |
| $Fe_2O_3$ | 0.058 | 0.065 | 0.080 | 0.065 | 0.067 |
| Melting Temp. °F. | 2550 | 2566 | 2561 | 2533 | 2570 |
| Forming Temp. °F. | 1806 | 1828 | 1827 | 1806 | 1836 |
| Working Range °F. | 73 | 76 | 94 | 64 | 84 |

| | 21 | 22 | 23 | 24 | 25 |
|---|---|---|---|---|---|
| $SiO_2$ | 68.33 | 67.06 | 68.33 | 68.00 | 67.26 |
| $Al_2O_3$ | 2.02 | 3.65 | 2.01 | 2.62 | 3.11 |
| ($SiO_2 + Al_2O_3$) | 70.35 | 70.71 | 70.34 | 70.62 | 70.37 |
| $Na_2O$ | 17.34 | 17.33 | 17.42 | 16.84 | 17.31 |
| $K_2O$ | 0.47 | 0.79 | 0.47 | 0.57 | 0.68 |
| ($Na_2O + K_2O$) | 17.81 | 18.12 | 17.89 | 17.41 | 17.99 |
| CaO | 8.42 | 8.04 | 7.95 | 7.87 | 7.91 |
| MgO | 3.03 | 2.75 | 3.38 | 3.72 | 3.33 |
| (CaO + MgO) | 11.45 | 10.79 | 11.33 | 11.59 | 11.24 |
| (CaO/MgO) | 2.779 | 2.924 | 2.352 | 2.116 | 2.375 |
| $SO_3$ | 0.30 | 0.31 | 0.35 | 0.30 | 0.31 |
| $Fe_2O_3$ | 0.097 | 0.084 | 0.095 | 0.097 | 0.095 |
| Melting Temp. °F. | 2516 | 2550 | 2531 | 2547 | 2547 |
| Forming Temp. °F. | 1793 | 1814 | 1803 | 1814 | 1812 |
| Working Range °F. | 60 | 81 | 95 | 71 | 103 |

| | 26 | 27 | 28 |
|---|---|---|---|
| $SiO_2$ | 67.18 | 67.07 | 67.30 |
| $Al_2O_3$ | 3.19 | 3.16 | 3.17 |
| ($SiO_2 + Al_2O_3$) | 70.37 | 70.23 | 70.47 |
| $Na_2O$ | 17.67 | 17.50 | 18.05 |
| $K_2O$ | 0.69 | 0.69 | 0.65 |
| ($Na_2O + K_2O$) | 18.36 | 18.19 | 18.70 |
| CaO | 7.79 | 8.36 | 7.88 |
| MgO | 3.09 | 2.84 | 3.15 |
| (CaO + MgO) | 10.88 | 11.20 | 11.03 |
| (CaO/MgO) | 2.521 | 2.943 | 2.502 |
| $SO_3$ | 0.29 | 0.30 | 0.005 |
| $Fe_2O_3$ | 0.101 | 0.100 | 0.084 |
| Melting Temp. °F. | 2537 | 2532 | 2464 |
| Forming Temp. °F. | 1805 | 1798 | 1774 |
| Working Range °F. | 95 | 50 | 55 |

The raw material formulations from which the glass compositions of the present invention may be melted can readily be calculated by those of skill in the art. By way of example, the batch mixture for Example 28 was:

| Ingredient | Parts by Weight |
|---|---|
| Sand | 3899 |
| Soda ash | 1846 |
| Limestone | 374 |
| Dolomite | 1042 |
| Rouge | 2 |
| Nepheline syenite | 837 |

Other raw materials are known to yield the same constituents and may be used in place of or in addition to the raw materials set forth in the example above. It should also be understood that various refining aids and coloring agents may be added in minor amounts without affecting the desired qualities of the glasses of the present invention. For commercial production some adjustments in the batch mixture may be necessary to accommodate losses of some of the materials due to volatilization or entrainment in accordance with the characteristics of the particular melting operation being used.

The following table shows the superior abrasion resistance of the glass of the present invention as compared to the standard commercial float glass composition set forth in the Background section above. The comparison is with Example 28 of the present invention, which was also formed into a flat sheet by the float process. The surface of the glass which was in contact with the molten tin during the float process is normally more abrasion resistant than the other ("air") side, therefore the results for both surfaces are reported separately. Abrasion was tested by the Taber abrasion test of ASTM C-501 in which the increase in the amount of haze is measured after a certain number of rotations of the glass sample in contact with an abrasive pad. It can be seen that the glass of the present invention shows less formation of haze due to abrasion on both surfaces compared to the standard glass composition.

| Number of Cycles | Abrasion Test Haze Difference (percent) | | | |
|---|---|---|---|---|
| | Standard | | Example 28 | |
| | Tin | Air | Tin | Air |
| 500 | 0.81 | 0.83 | 0.44 | 0.50 |
| 1000 | 1.16 | 1.09 | 0.82 | 0.71 |
| 1500 | 1.25 | 1.24 | 0.98 | 0.88 |
| 2000 | 1.39 | 1.36 | 1.17 | 1.04 |

In another test of surface durability samples of the standard float glass and Example 28 were placed into a closed chamber and subjected to heating and cooling cycles to repeatedly vaporize and condense water vapor on their surfaces. The surfaces that had been contacted by tin during the float process of all of the samples showed resistance to corrosion, but corrosion of the non-tin side of the standard samples progressed to the point of substantially impairing transparency in 17 to 19 days, whereas no impairment of transparency occurred with the glass of Example 28 until after 90 days of exposure.

The improved thermal tempering capabilities of the invention can be attributed to a higher coefficient of thermal expansion. The expansion coefficient of the standard float glass composition set forth above is $8.62 \times 10^{-6}/°C$. as compared to $10.44 \times 10^{-6}/°C$. The expansion coefficients were determined by the dilatometer method using a one inch rod of glass in accordance with the procedure of ASTM E-228-71, and the coefficients reported are for the range 25° C. to 300° C. Sheets of the standard float glass and the glass of Example 28 were thermally tempered side-by-side in the same process under four different sets of process variables. In each case the amount of surface compression as measured by a differential surface refractometer, which is an indication of the degree of strengthening attained by the tempering, was 10 to 15 percent higher with the glass of the present invention. In another comparison, sheets of varying thickness were tempered on the same thermal tempering line to the maximum surface compression level attainable on that line. The maximum surface compression attainable by the standard glass composition was 26,000 pounds per square inch with a sheet 0.225 inches thick. The glass of example 28, however, was able to attain the same surface compression level with a sheet only 0.155 inches thick. This indicates that the glass of the present invention has the capability of providing a given level of strength with a thinner, and therefore lighter, product than standard float glass.

Some proposed glass compositions having reduced melting temperatures have the disadvantage of being more corrosive than usual to the refractory structure of melting furnaces. In tests of the corrosiveness of the glasses of the present invention in comparison with the standard float glass composition, the corrosiveness has been found to be substantially equivalent at the same temperatures. Furthermore, since the glasses of the present invention are intended to be melted at lower temperature, significantly less corrosion of the furnace refractories can be expected.

The range of viscosities encountered in manufacturing flat glass is exhibited by the glasses of the present invention over a smaller range of temperatures than standard float glass. This leads to several manufacturing advantages in addition to the obvious savings of energy due to lower melting temperatures. Because the melting and forming temperatures are closer together, a melting furnace can be operated at higher throughputs without inducing thermal instabilities because less cooling is needed at the downstream end of the melting furnace to prepare the glass for forming. The forming temperatures and annealing temperatures are also closer together, which has benefits in operating a float forming chamber at greater throughputs. Alternatively, a shorter, less costly float forming chamber could be utilized with the glasses of the present invention. Similarly, thermally tempering is easier because of a smaller difference between the softening point and the strain point of the glass of the present invention.

Although the advantages of the present invention could be applicable to the making of any glass product, the glass of the present invention is particularly suitable for making flat glass, most of which is made by the float process. Therefore, flat glass products made in accordance with the present invention will typically have a trace of tin oxide present near at least one surface due to the contact of the glass with molten tin during the forming process. Typically, a piece of float glass has a tin oxide concentration of at least 0.05 percent by weight (measured as $SnO_2$) within the first few microns below the surface that was in contact with the molten tin. Other deliberate modifications of the surface portion of glass during or after forming are known. These include migrating ions into the surface of the glass to modify the color of the glass or to strengthen the glass. It should be understood that the compositions given herein relate to the bulk glass composition, that is, the vast majority of the interior volume of a glass product, and do not preclude the possibility of compositional variations of this type at minor surface portions.

This description of the invention has been made with reference to specific examples, but it should be understood that variations and modifications as are known to those of skill in the art may be resorted to without departing from the scope of the invention as defined by the claims that follow.

We claim:

1. A glass composition comprising:

| | |
|---|---|
| $SiO_2$ | 66.0–69.1 weight percent |
| $Al_2O_3$ | 2.0–4.0 |
| ($SiO_2$ + $Al_2O_3$) | Less than 71.6 |
| $Na_2O$ | 15–19 |
| $K_2O$ | 0–2 |
| ($Na_2O$ + $K_2O$) | 15–20 |

| | |
|---|---|
| CaO | 7.5-9 |
| MgO | 2-4 |
| (CaO + MgO) | 10.2-12.0 |
| (CaO/MgO) | 1.9-3.5 | wherein the glass exhibits a positive working range and a viscosity of 100 poises at a temperature equal to or less than about 2590° F. (1422° C.).

2. The glass composition of claim 1 comprising:

| | |
|---|---|
| $SiO_2$ | 66.5-68.5 |
| $Al_2O_3$ | 2.0-4.0 |
| ($SiO_2 + Al_2O_3$) | Less than 71.1 |
| $Na_2O$ | 16.5-19 |
| $K_2O$ | 0-2 |
| ($Na_2O + K_2O$) | 17.2-20 |
| CaO | 7.5-8.5 |
| MgO | 2-4 |
| (CaO + MgO) | 10.2-12.0 |
| (CaO/MgO) | 1.9-3.5. |

3. The glass composition of claim 1 consisting essentially of:

| | |
|---|---|
| $SiO_2$ | 66.0-69.1 weight percent |
| $Al_2O_3$ | 2.0-4.0 |
| ($SiO_2 + Al_2O_3$) | Less than 71.6 |
| $Na_2O$ | 15-19 |
| $K_2O$ | 0-2 |
| ($Na_2O + K_2O$) | 15-20 |
| CaO | 7.5-9 |
| MgO | 2-4 |
| (CaO + MgO) | 10.2-12.0 |
| (CaO/MgO) | 1.9-3.5 |
| Colorants | 0-1 |
| Refining aids | 0-1. |

4. The glass composition of claim 1 consisting essentially of:

| | |
|---|---|
| $SiO_2$ | 66.5-68.5 weight percent |
| $Al_2O_3$ | 2.0-4.0 |
| ($SiO_2 + Al_2O_3$) | Less than 71.1 |
| $Na_2O$ | 16.5-19 |
| $K_2O$ | 0-2 |
| ($Na_2O + K_2O$) | 17.2-20 |
| CaO | 7.5-8.5 |
| MgO | 2-4 |
| (CaO + MgO) | 10.2-12.0 |
| (CaO/MgO) | 1.9-3.5 |
| Colorants | 0-1 |
| Refining aids | 0-1. |

5. A flat glass product comprising a sheet of glass whose bulk composition comprises:

| | |
|---|---|
| $SiO_2$ | 66.0-69.1 weight percent |
| $Al_2O_3$ | 2.0-4.0 |
| ($SiO_2 + Al_2O_3$) | Less than 71.6 |
| $Na_2O$ | 15-19 |
| $K_2O$ | 0-2 |
| ($Na_2O + K_2O$) | 15-20 |
| CaO | 7.5-9 |
| MgO | 2-4 |
| (CaO + MgO) | 10.2-12.0 |
| (CaO/MgO) | 1.9-3.5 | wherein the glass exhibits a positive working range and a viscosity of 100 poises at a temperature equal to or less than about 2590° F. (1422° C.).

6. The flat glass product of claim 5 comprising a sheet of glass whose bulk composition comprises:

| | |
|---|---|
| $SiO_2$ | 66.5-68.5 weight percent |
| $Al_2O_3$ | 2.0-4.0 |
| ($SiO_2 + Al_2O_3$) | Less than 71.1 |
| $Na_2O$ | 16.5-19 |
| $K_2O$ | 0-2 |
| ($Na_2O + K_2O$) | 17.2-20 |
| CaO | 7.5-8.5 |
| MgO | 2-4 |
| (CaO + MgO) | 10.2-12.0 |
| (CaO/MgO) | 1.9-3.5. |

7. The flat glass product of claim 5 comprising a sheet of glass whose bulk composition consists essentially of:

| | |
|---|---|
| $SiO_2$ | 66.0-69.1 weight percent |
| $Al_2O_3$ | 2.0-4.0 |
| ($SiO_2 + Al_2O_3$) | Less than 71.6 |
| $Na_2O$ | 15-19 |
| $K_2O$ | 0-2 |
| ($Na_2O + K_2O$) | 15-20 |
| CaO | 7.5-9 |
| MgO | 2-4 |
| (CaO + MgO) | 10.2-12.0 |
| (CaO/MgO) | 1.9-3.5 |
| Colorants | 0-1 |
| Refining aids | 0-1. |

8. The flat glass product of claim 5 comprising a sheet of glass whose bulk composition consists essentially of:

| | |
|---|---|
| $SiO_2$ | 66.5-68.5 weight percent |
| $Al_2O_3$ | 2.0-4.0 |
| ($SiO_2 + Al_2O_3$) | Less than 71.1 |
| $Na_2O$ | 16.5-19 |
| $K_2O$ | 0-2 |
| ($Na_2O + K_2O$) | 17.2-20 |
| CaO | 7.5-8.5 |
| MgO | 2-4 |
| (CaO + MgO) | 10.2-12.0 |
| (CaO/MgO) | 1.9-3.5 |
| Colorants | 0-1 |
| Refining aids | 0-1. |

9. The flat glass product of claim 5 wherein surface portions of the glass sheet include measurably greater amounts of tin oxide than in interior portions.

10. The flat glass product of claim 9 wherein the tin oxide concentration in surface portions is at least 0.05 percent by weight $SnO_2$.

11. The glass composition of claim 1 wherein the viscosity of 100 poises is at a temperature equal to or less than about 2560° F. (1404° C.).

12. The flat glass product of claim 5 wherein the product is thermally tempered.

13. The flat glass product of claim 5 wherein a surface of the product has a haze difference (percent) equal to or less than 0.50 for 500 cycles as tested by the Taber abrasion test of ASTM C-501.

14. The flat glass product of claim 5 wherein the viscosity of 100 poises is at a temperature equal to or less than about 2560° F. (1404° C.).

* * * * *